(12) United States Patent
Yoshihara et al.

(10) Patent No.: US 6,259,673 B1
(45) Date of Patent: Jul. 10, 2001

(54) ROUTE SELECTION METHOD

(75) Inventors: Kiyohito Yoshihara, Tokyo; Hiroki Horiuchi, Saitama; Keizo Sugiyama, Tokyo; Sadao Obana, Saitama, all of (JP)

(73) Assignee: Kokusai Denshin Denwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/128,520

(22) Filed: Aug. 3, 1998

(30) Foreign Application Priority Data

Aug. 12, 1997 (JP) .................................................. 9-230450

(51) Int. Cl.[7] .................................................. H04L 12/28
(52) U.S. Cl. ............................................ 370/238; 370/351
(58) Field of Search .................................. 370/230, 231, 370/235, 238, 351

(56) References Cited

U.S. PATENT DOCUMENTS

| 5,072,379 | * | 12/1991 | Eberhardt | 370/238 |
| 5,245,550 | * | 9/1993 | Miki et al. | 364/490 |
| 5,317,566 | * | 5/1994 | Joshi | 370/238 |
| 5,508,999 | * | 4/1996 | Cox, Jr. et al. | 370/238 |
| 5,832,069 | * | 11/1998 | Waters et al. | 370/115 |
| 5,899,955 | * | 5/1999 | Yagyu et al. | 701/209 |
| 5,933,425 | * | 8/1999 | Iwata | 370/351 |
| 6,088,333 | * | 7/2000 | Yang et al. | 370/238 |
| 6,104,701 | * | 8/2000 | Avargues et al. | 370/238 |

OTHER PUBLICATIONS

Atsushi Iwata, Rauf Izmailov, Koichi Horikawa, Hiroshi Suzuki, Bhaskar Senguputa, "QOS Routing Algorithm for ATM Networks with Multiple Quality of Service Requirements", *Technical Report of IEICE*, (Dec., 1995).

Chotipat Pornavalai, Foutam Chakraborty, Norio Shiratori, "QoS Routing Algorithm for Multimedia Communication", *Tecnical Report of IEICE*, (Apr., 1997).

Refael Hassin, "Approximation Schemes For The Restricted Shortest Path Problem", *Mathematics of Operations Research*, vol. 17, No. 1, (Feb. 1992).

Atsushi Iwata, Raug Izmailov, Duan–Shin Lee, Bhaskar Sengupta, F. Ramamurthy, Hiroshi Suzuki, "ATM Routing Algorithms with Multiple QOS Requirements for Multimedia Internetworking", *IEICE Trans. Commun.*, vol. E479–B, pp. 999–1007, (Aug. 1996).

* cited by examiner

*Primary Examiner*—Wellington Chin
*Assistant Examiner*—Brenda Pham
(74) *Attorney, Agent, or Firm*—Westman, Champlin & Kelley, P.A.

(57) ABSTRACT

If an error range is specified with regard to the cost beforehand, a route satisfying all of a plurality of QoS conditions at a low cost and having a cost in the error range is selected as an optimum route. Such a route selection method is provided.

At step S1, a plurality of QoS conditions to be satisfied are set. At step S2, an approximation error $\epsilon$ is input. At step S3, a range of a cost for searching for an optimum route is tentatively set. At step S4, an optimum solution cost approximation procedure is executed. At step S5, it is determined whether the cost searching range has been sufficiently narrowed. If the narrowed cost searching range is still too wide, then the processing returns to the step S4 and the optimum solution cost approximation procedure is repeated. If the cost searching range has already been narrowed, an optimum solution deriving procedure is executed at step S6.

10 Claims, 10 Drawing Sheets

| | | NODE | | | |
|---|---|---|---|---|---|
| | | B (2) | C (3) | ... | J (10) |
| COST | 1 | (−, −, −) | (−, −, −) | | (−, −, −) |
| | 2 | (3, 2, 0.005) | (−, −, −) | | (−, −, −) |
| | 3 | (3, 2, 0.005) | (−, −, −) | | (−, −, −) |
| | 4 | (3, 2, 0.005) | (3, 4, 0.000975) | | (−, −, −) |
| | ⋮ | ⋮ | ⋮ | | ⋮ |
| | 14 | | | | (3, 14, 0.049) |

|  | COST | BAND-WIDTH | TRANSMISSION DELAY | ERROR RATE |
|---|---|---|---|---|
| BETWEEN A AND B | 2 | 3 | 2 | 0.005 |
| BETWEEN A AND E | 26 | 4 | 2 | 0.015 |
| BETWEEN A AND G | 2 | 4 | 22 | 0.005 |
| BETWEEN B AND C | 2 | 3 | 2 | 0.005 |
| BETWEEN C AND D | 20 | 3 | 14 | 0.015 |
| BETWEEN C AND F | 2 | 4 | 2 | 0.001 |
| BETWEEN D AND J | 20 | 2 | 14 | 0.010 |
| BETWEEN E AND F | 2 | 5 | 2 | 0.015 |
| BETWEEN E AND H | 2 | 5 | 2 | 0.015 |
| BETWEEN F AND J | 20 | 7 | 8 | 0.005 |
| BETWEEN G AND H | 2 | 4 | 2 | 0.005 |
| BETWEEN H AND I | 2 | 3 | 2 | 0.005 |
| BETWEEN I AND J | 2 | 5 | 2 | 0.005 |

ROUTE SELECTION METHOD

BACKGROUND OF THE INVENTION

1. Field of the Invention

The present invention relates to a route selection method for selecting a route satisfying a condition with regard to a plurality of Quality of Service (QoS) out of routes each connecting a start point to an end point, and in particular to a route selection method, responsive to an approximation proportion of cost specified beforehand, for selecting a route satisfying a condition with regard to a plurality of QoSs a low cost within the approximation proportion.

2. Description of the Related Art

For high utilization of a network, a route selection technique simultaneously satisfying a desired condition with regard to a plurality of QoSs, such as the bandwidth, transmission delay, and error rate, of a communication route at a low cost is necessary and indispensable. Also in ATM (Asynchronous Transfer Mode) spreading in recent years, a QoS such as cell delay variation tolerance, cell transfer delay, and cell loss ratio are defined. The importance of the communication route selection technique capable of satisfying a desired condition with regard to a plurality of QoSs is increasing. According to their properties, a QoS can be classified broadly into the following three kinds.

(1) Additive property

It is such a property that the QoS value of a route becomes the sum of QoS values of respective links forming the route. For example, the transmission delay and the cell transfer delay come under the property.

(2) Multiplicative property

It is such a property that the QoS value of a route becomes a function of product of QoS values of respective links forming the route. For example, the error rate and the cell loss ratio come under the property.

(3) Concave property

It is such a property that the QoS value of a route becomes the minimum value among QoS values of respective links forming the route. For example, the bandwidth comes under the property.

As a conventional technique for selecting a low cost route satisfying a condition with regard to a plurality of QoSs, "rule-based route selecting system" will now be described by referring to a flow chart of FIG. 8. It is now assumed on a network having ten nodes (A to J) as shown in FIG. 9 that a route satisfying all desired QoS conditions from a node A (start point) to a node J (end point) and requiring the lowest cost is selected. In addition, it is now assumed that the link cost, bandwidth, transmission delay, and error rate between nodes have values as shown in FIG. 10, and QoS conditions to be satisfied are the following three conditions.

QoS condition 1—The bandwidth should be at least 3.

QoS condition 2—The transmission delay should be at most 16.

QoS condition 3—The error rate should be at most 0.05.

At step S71, links which do not satisfy the desired conditions with regard to the bandwidth which is the concave QoS are excepted. In the present implementation form, the bandwidth between D and J is "2" and hence it does not satisfy the QoS condition 1. Therefore, the route DJ is excepted from the subjects of the route selection. At step S72, the other QoS conditions to be satisfied are provided with priorities, and a maximum number of times of trial N described later in detail is determined. The present implementation form will be described, assuming that the QoS condition 2 (transmission delay) is provided with a priority higher than that of the QoS condition 3 (error rate) and the maximum number of times of trial N is set to 2.

At step S73, the cost function or one of the QoS conditions is selected. At first, however, the cost function is always selected. At step S74, the condition selected at the step S73, i.e., at first a route P0 minimizing the cost function is selected regardless of other QoS conditions. In the example shown in FIG. 10, the route P0 of the start point A→G→H→I→the end point J is selected. At step S75, it is determined whether the route P0 satisfies all of the QoS conditions. In the route P0, the transmission delay becomes "28" and hence the QoS condition 2 is not satisfied. Therefore, the processing proceeds to step S78.

At the step S78, it is determined whether the number of times of trial n (=1) has exceeded the maximum number of times of trial N (=2). Since n is not yet exceeded in this case, the processing proceeds to step S77, where the number of times of trial n is increased by one, and the processing returns to the step S73. At the step S73, the QoS condition 2 (transmission delay) having a higher priority is selected this time. At the step S74, a route P1 minimizing the transmission delay is selected regardless of other QoS conditions.

In the present implementation form, the route P1 of the start point A→E→H→I→end point J is selected. At the step S75, it is determined whether the route P1 satisfies all other QoS conditions simultaneously. In the present implementation form, the error rate in the route P1 becomes at most 0.05 and consequently the QoS condition 3 is satisfied. Since all other QoS conditions are thus satisfied, the processing proceeds to step S76. At the step S76, the route P1 is output as an optimum route. If the decision at the step S75 becomes negation repeatedly and the number of times of trial n has exceeded the maximum number of times of trial N at the step S78, then information representing that there is no route satisfying the conditions is output at step S79.

The above described conventional technique had the following problems.

(1) The approximation precision depends upon the empirical law.

At the step S72, each QoS condition is provided with a priority on the basis of the empirical law of the user. According to the priority, it is successively determined whether there is a route satisfying each QoS condition. Without the knowledge concerning the kind and property of each QoS condition, an optimum route or a route having a high approximation precision cannot be selected.

For example, contrary to the foregoing description, it is now assumed that the QoS condition 3 (error rate) is provided at the step S72 with a priority higher than that of the QoS condition 2 (transmission delay) . At the step S73, in this case, a route represented as the start point A→B→C→F→the end point J is represented as the minimum error rate route P2. This route P2 has a transmission delay of "14", and satisfy all QoS conditions. And the sum of the link costs of the route P2 is "26", and it becomes less than the cost "32" of the route P1.

Since the selected route thus differs depending upon how QoSs are provided with priorities, the approximation precision depends upon the empirical law. If the number r of the QoS conditions increases, the number of ways of providing QoSs with priorities increases as represented by $r! = r \times (r-1) \times \ldots 2 \times 1$. Therefore, the approximation precision furthermore depends upon the empirical law.

(2) The approximation precision is fixed.

The approximation proportion is fixedly determined by the network configuration such as the number or cost of nodes and links, bandwidth, transmission delay, and error rate. There occurs such a situation that network resources satisfying QoS conditions desired by the network provider or the network users cannot be flexibly assigned.

For example, in the above described conventional system, a route A→E→H→I→J minimizing the transmission delay irrespective of the cost is selected. However, the sum of link costs of this route is "32", whereas the sum of link costs of the optimum solution is "14". The approximation ratio is 32/14, i.e., approximately 2.3. Therefore, the maximum value of the approximation ratio, i.e., the approximation proportion of the conventional technique in an arbitrary network becomes at least 2.3.

In the above described conventional technique, the approximation proportion is fixedly determined by the network configuration such as the link cost. Even if it is attempted to derive a route having a higher approximation precision in an arbitrary network by, for example, making the approximation proportion less than 2.3, therefore, such a demand is not satisfied, resulting in a problem.

SUMMARY OF THE INVENTION

An object of the present invention is to provide a route selection method which does not depend upon the empirical law of the user, and which can select, in response to specification of an arbitrary approximation error $\epsilon$ given at the time of execution, an optimum route satisfying a desired approximation proportion (1+$\epsilon$) regardless of the network configuration.

In order to achieve the object, a route selection method for selecting a route satisfying a plurality of QoS conditions at a low cost, out of a plurality of routes connecting a start point to an end point via at least one node according to the present invention includes the steps of: setting conditions for a plurality of QoSs, respectively; inputting an error range permissible for a cost of an unknown optimum route; tentatively setting a cost searching range containing at least the cost of the optimum route; determining whether the cost searching range has been narrowed to a searching possible range which is a function of the error range; in response to judgment that the cost searching range has not been narrowed to the searching possible range, deriving a plurality of QoSs of routes leading from the start point to respective nodes at each cost, in order of cost, beginning with a lowest cost within a current cost searching range, on the basis of QoSs of nodes having QoSs already derived; narrowing the cost searching range, on the basis of whether a route leading from the start point to the end point and satisfying all of the plurality of QoS conditions is found until a reference cost given as a function of the error range is reached; and searching the narrowed cost searching range for an optimum route.

According to the above described route selection method, a substantially optimum route held in a predetermined error range can be selected without depending upon the operator's knowledge or experience concerning the QoS conditions.

DESCRIPTION OF THE PREFERRED EMBODIMENTS

Hereafter, the present invention will be described in detail by referring to drawing. At first, the basic concept of the present invention will be described briefly. Thereafter, the present invention will be described in detail by referring to concrete examples.

Figure 1:
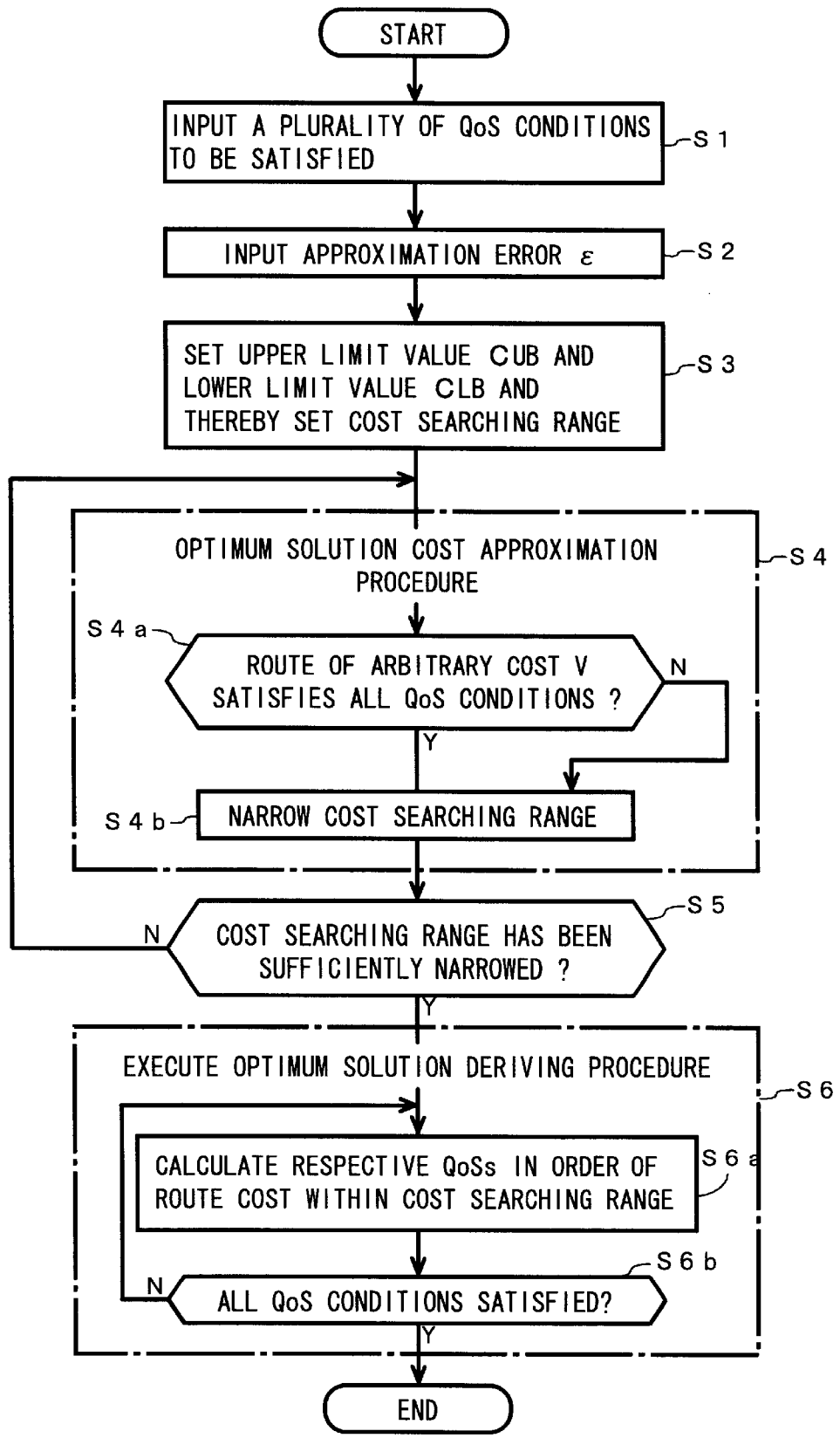
FIG. 1 is a schematic flow chart of a route selection method according to the present invention.
Figures 9, 10:
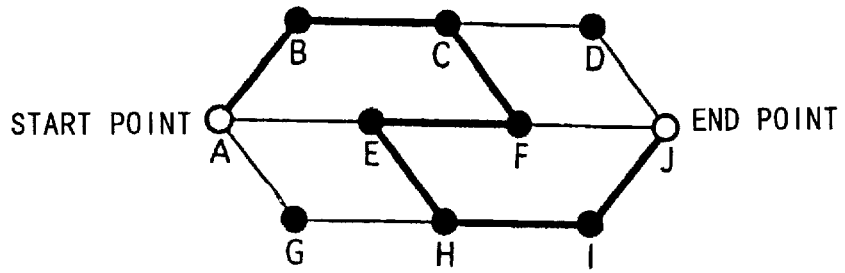
FIG. 9 is a diagram showing an example of a network configuration.
FIG. 10 is a diagram showing properties of respective links in a list form.

FIG. 1 is a flow chart showing the schematic operation of an embodiment of a route selection method according to the present invention. It is now assumed that out of a plurality of routes connecting a start point A to an end point J via a plurality of transit nodes, an optimum route simultaneously satisfying a plurality of QoS conditions at a low cost is selected, as shown in FIG. 10. By taking this case as an example, the flow chart of FIG. 1 will now be described.

At step S1, desired conditions concerning QoSs such as the bandwidth, transmission delay, and error rate are set as a plurality of QoS conditions to be satisfied. With respect to the cost (optimum cost) of an unknown optimum route requiring a minimum cost among routes satisfying all of the plurality of QoS conditions, a permissible approximation error $\epsilon$ is input at step S2. For example, if the cost burden is permitted to the extent of 1.5 times the optimum cost (i.e., to the extent of 1.5 in approximation proportion), 0.5 is input as the approximation error $\epsilon$.

At step S3, an upper limit value CUB and a lower limit value CLB containing the above described optimum cost between them are appropriately set, and thereby a cost searching range searched for the optimum cost (hereafter referred to simply as cost searching range) is tentatively set. In other words, if it is predicted that the optimum cost will be in the range of, for example, 30±20, then 10 (=30−20) is set as the lower limit value CLB of the search cost searching range and 50 (=30+20) is set as the upper limit value CUB of the search cost searching range. The cost searching range is thus narrowed down to the range of 10 to 50.

At step S4, an optimum solution cost approximation procedure described later in detail is executed. The optimum solution cost approximation procedure is preprocessing for narrowing beforehand the cost searching range searched in an optimum solution deriving procedure to be executed later at step S6. The optimum solution cost approximation procedure is executed for the purpose of shortening the search time spent in the optimum solution deriving procedure.

Figures 2, 3:
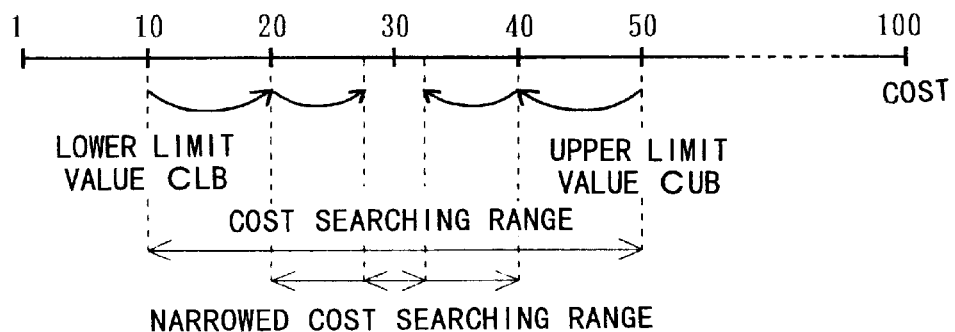
FIG. 2 is a diagram schematically representing the basic concept of the present invention.
FIG. 3 is a diagram illustrating an optimum solution deriving procedure.

FIG. 2 is a diagram schematically representing the relation between the optimum solution cost approximation procedure and the optimum solution deriving procedure. For example, if it is attempted to derive an optimum cost by using only the optimum solution deriving procedure in the case where the sum of the link costs required from the start point A to the end point J can take the cost of 1 to the cost of 100, the whole cost searching range (1 to 100) must be searched. In other words, it must first be determined whether there is a route connecting the start point A to the end point J at a cost of 1. If there is not such a route, then it must be determined whether there is a route connecting the start point A to the end point J at a cost of 2. Such a determination must be repeated. Although the optimum route and the optimum cost could be derived by using the optimum solution deriving procedure, therefore, the optimum solution deriving procedure had a problem of requiring a long time until they could be derived.

In the present invention, such a problem is eliminated by setting the upper limit value CUB and the lower limit value CLB concerning the cost searching range to be searched and thereby narrowing the cost searching range beforehand at the step S3 of FIG. 1. If the cost searching range is still wide, the optimum solution cost approximation procedure is repeatedly executed prior to the optimum solution deriving procedure in order to further narrow the cost searching range. And the optimum solution deriving procedure is executed for only a narrow cost searching range.

To be more concrete, it is determined whether a route having an arbitrary cost V satisfies all of a plurality of QoS conditions in the optimum solution cost approximation procedure at the step S4 (step S4a). If the route satisfies all QoS conditions, it is found that the optimum (minimum) cost is equal to or less than the arbitrary cost V. On the contrary, if there is even one QoS condition which is not satisfied, it is found that the optimum cost is at least the arbitrary cost V. On the basis of the result of the above described determination, therefore, the cost searching range can be narrowed (step S4b).

At step S5, it is determined whether the cost searching range has been sufficiently narrowed. If the narrowed cost searching range is still too wide, then the processing returns to the step S4, and the optimum solution cost approximation procedure is repeated. If the cost searching range is already sufficiently narrowed, the optimum solution deriving procedure at step S6 is executed. At step S6, a plurality of QoS values concerning each route are derived in the order of link cost, beginning with the lowest link cost within the narrowed cost searching range (step S6a). A route first satisfying all QoS conditions is regarded as a substantial optimum route (step S6b).

Figure 11:
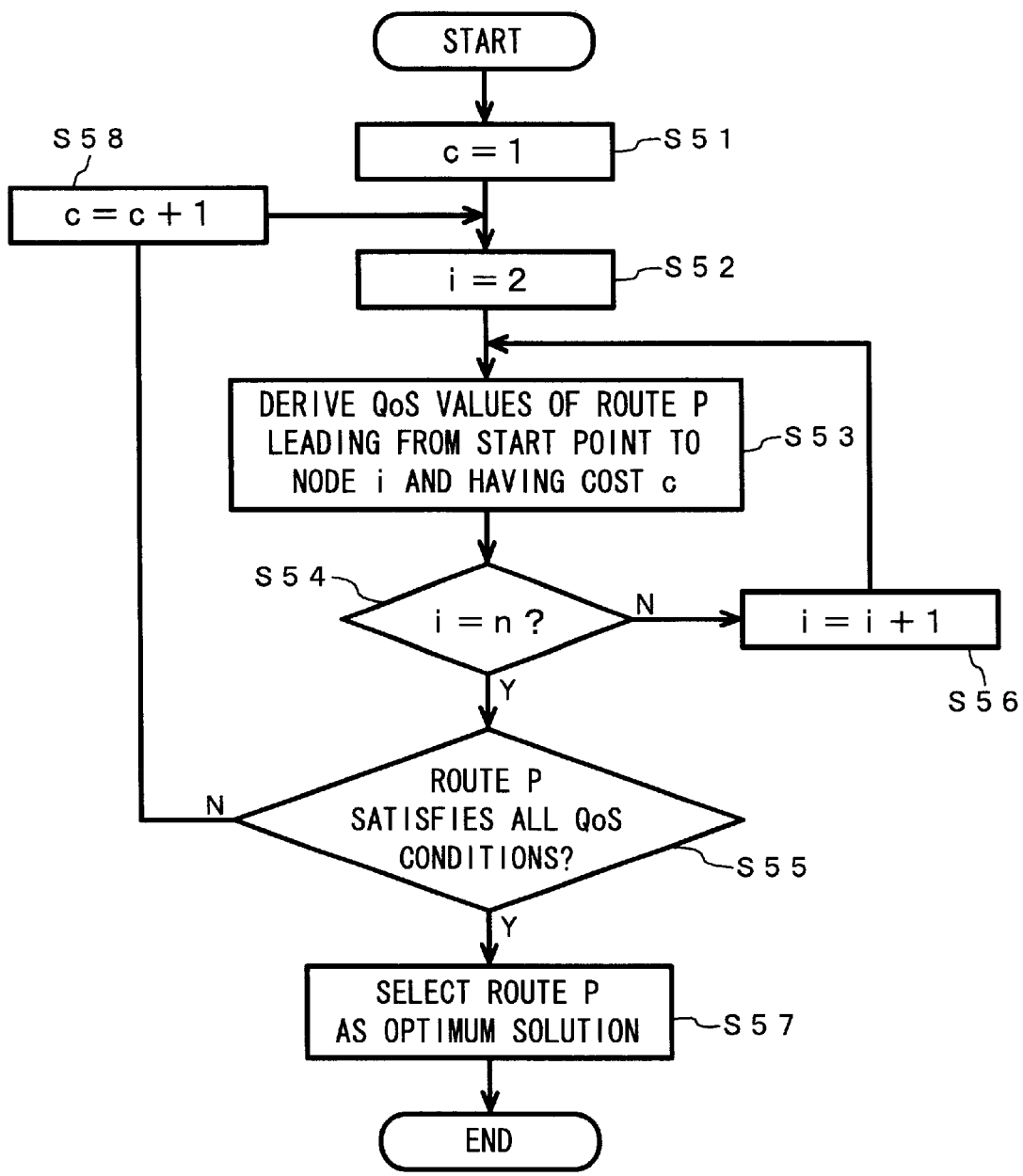
FIG. 11 is a flow chart of an optimum solution deriving procedure.

FIG. 3 is a diagram illustrating the contents of the optimum solution deriving procedure. FIG. 11 is a flow chart showing its operation.

At step S51, a cost variable c is set to its initial value "1" in order to derive each QoS value required to proceed from the start point A to each node, every cost in the order of cost, beginning with the minimum cost (=1). At step S52, a node variable i is set to its initial value "2" in order to derive all QoSs required to proceed from the start point A (the first node) to an ith node, every cost.

At step S53, all QoSs required to proceed from the start point A to an ith node (which is the second node B) are derived, for a route having a cost coinciding with the cost variable c (which is "1" here).

At step S54, it is determined whether the node variable i is n, i.e., whether the processing has proceeded to the end point J for a route having the cost variable of c (=1). At the first trial, the node variable i is equal to or less than n. Therefore, the processing proceeds to step S56. At the step S56, the node variable i is increased by one, and the processing returns to the step S53.

For the case where the cost variable c is "1", the processing of the steps S53, S54 and S56 is repeated in the same way whenever the node variable i is increased until the node variable i reaches n. In the present embodiment, costs between the start point A and the node B, between the start point A and the node E, and between the start point A and the node G are respectively 2, 26, and 2 as shown in FIG. 10. Since the cost variable c (=1) is already exceeded, any QoS value is not registered in QoS columns (1, B) to (1, J) concerning the cost variable c (=1) as shown in FIG. 3. If the node variable i is judged at the step S54 to be coincident with n, the processing proceeds to step S55. At the step S55, it is determined whether the route from the start point A to the end point J satisfies all QoS conditions. In the present embodiment, a route having the cost variable c equivalent to "1" is not present, and the QoS value has not been registered in each QoS column. Therefore, the decision at the step S55 yields negation, and the processing proceeds to step S58. At the step S58, the cost variable c is increased by one. Thereafter, the processing returns to the step S52.

Subsequently, for a route having the cost variable c equivalent to "2", the processing of the steps S52 to S54 and S56 is repeated in the same way as the foregoing description until the node variable i reaches n. In the present embodiment, the cost variable c of the routes as far as the node B and as far as the node G is "2". As shown in FIG. 3, therefore, (3, 2, 0.005) is stored in a QoS column (2, B) as QoSs concerning the bandwidth, transmission delay, and error rate.

In the present embodiment, however, the cost of the route from the node A to the node B is already "2". With the cost of "2", an advance from the node B to the next node is impossible. In QoS columns (2, C) to (2, J), therefore, QoS values are not registered. In the same way, an advance from the node B to the next node is impossible even at a cost of "3". In QoS column (3, B), therefore, the QoS value (3, 2, 0.005) is registered in the same way as the foregoing description. In QoS columns (3, C) to (3, J), however, QoS values are not registered.

With a cost of "4", an advance from the node B to the node C is possible. In QoS column (4, B), therefore, the QoS value (3, 2, 0.005) is registered in the same way as the foregoing description. In QoS column (4, C), a QoS value (3, 4, 0.00975) is registered.

Hereafter, a QoS value as far as each node is derived for each cost variable. If there is a route reaching the node J, each QoS value at that time is compared with a reference value. If as a result even one QoS value does not satisfy the reference condition, then the processing returns from the step S55 to the step S58, the cost variable is increased, and the above described processing is furthermore repeated. If in any cost variable each QoS value of a route reaching the node J satisfies all reference conditions, then the processing proceeds from the step S55 to step S57, and the route is judged to be an optimum solution.

Figure 12:
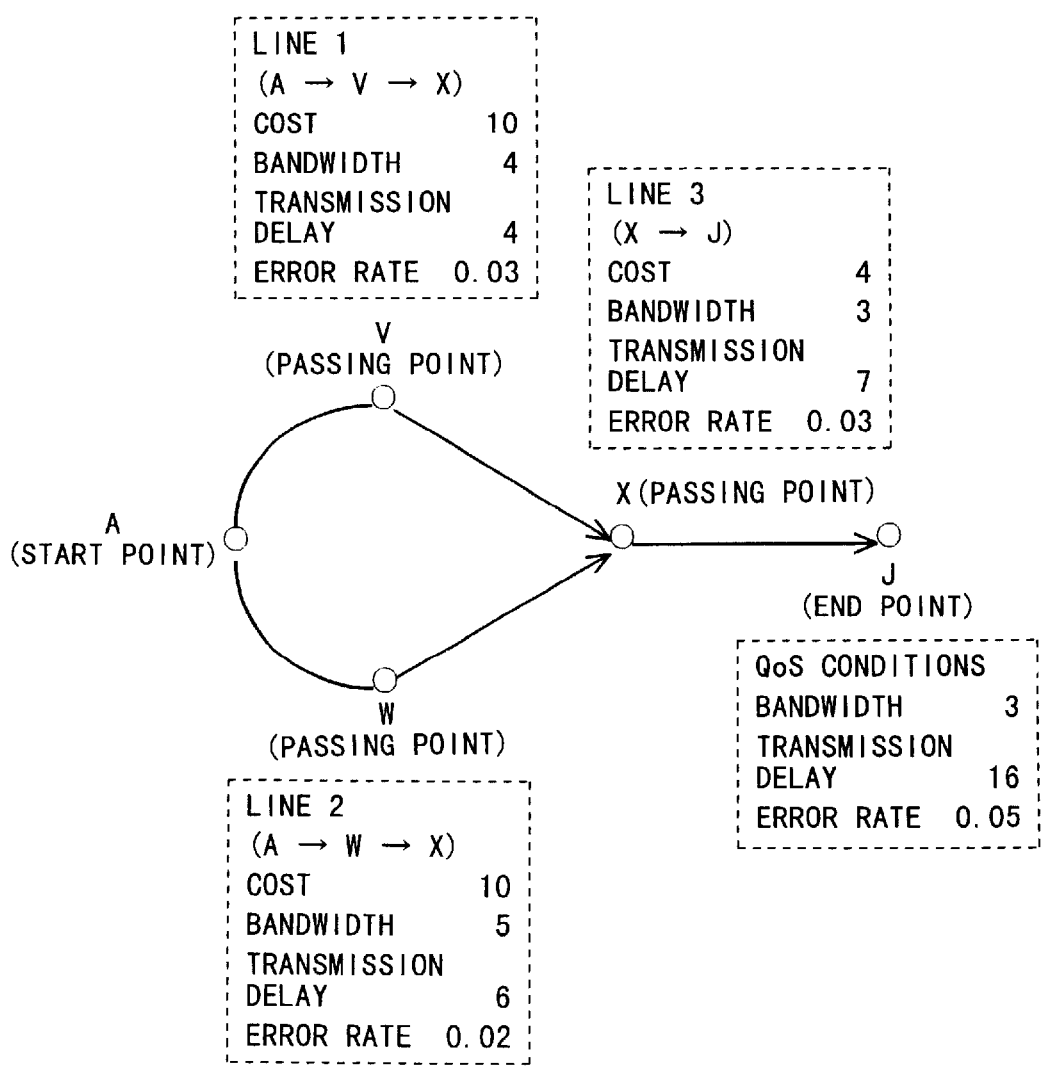
FIG. 12 is a diagram illustrating problems in the route selection.

As schematically shown in FIG. 12, it is now assumed that there is a route 1 passing through a node V and a route 2 passing through a node W as routes reaching a node X (passing point) located between the start point A and the end point J. If in this case one of the routes is more excellent than the other of the routes for all QoSs, the QoS of the route reaching the end point J is derived as QoS of the route reaching the end point J via the more excellent one route.

However, it is possible that the route 1 is more excellent with regard to, for example, the bandwidth and transmission delay, but the route 2 is more excellent with regard to the error rate. If the relative excellence between the routes 1 and 2 is not determined uniquely with regard to QoSs as in this case, it poses a problem on the basis of which route the QoS of the route reaching the end point J is derived.

In the present embodiment, such a problem is solved as described below. If there are a plurality of routes reaching a passing node at the same cost and the relative excellence among the routes reaching the passing node is not determined uniquely with regard to QoSs, then it is first determined whether a route reaching the end point via an arbitrary one of the plurality of routes satisfies all QoS conditions. If even one of a plurality of QoS conditions is not satisfied, then it is this time determined whether a route reaching the end point via another route satisfies all QoS conditions. If all QoS conditions are satisfied, then the route is judged to be an optimum route.

Even in the case where in a process reaching the end point, there are a plurality of routes having the same cost which are not uniquely determined in relative excellence of QoSs, and such a route as not to be able to satisfy all QoS conditions at the end point is included among them, therefore, if even one route capable of satisfying all QoS conditions at the end point is included, that route can be selected.

Figure 4:
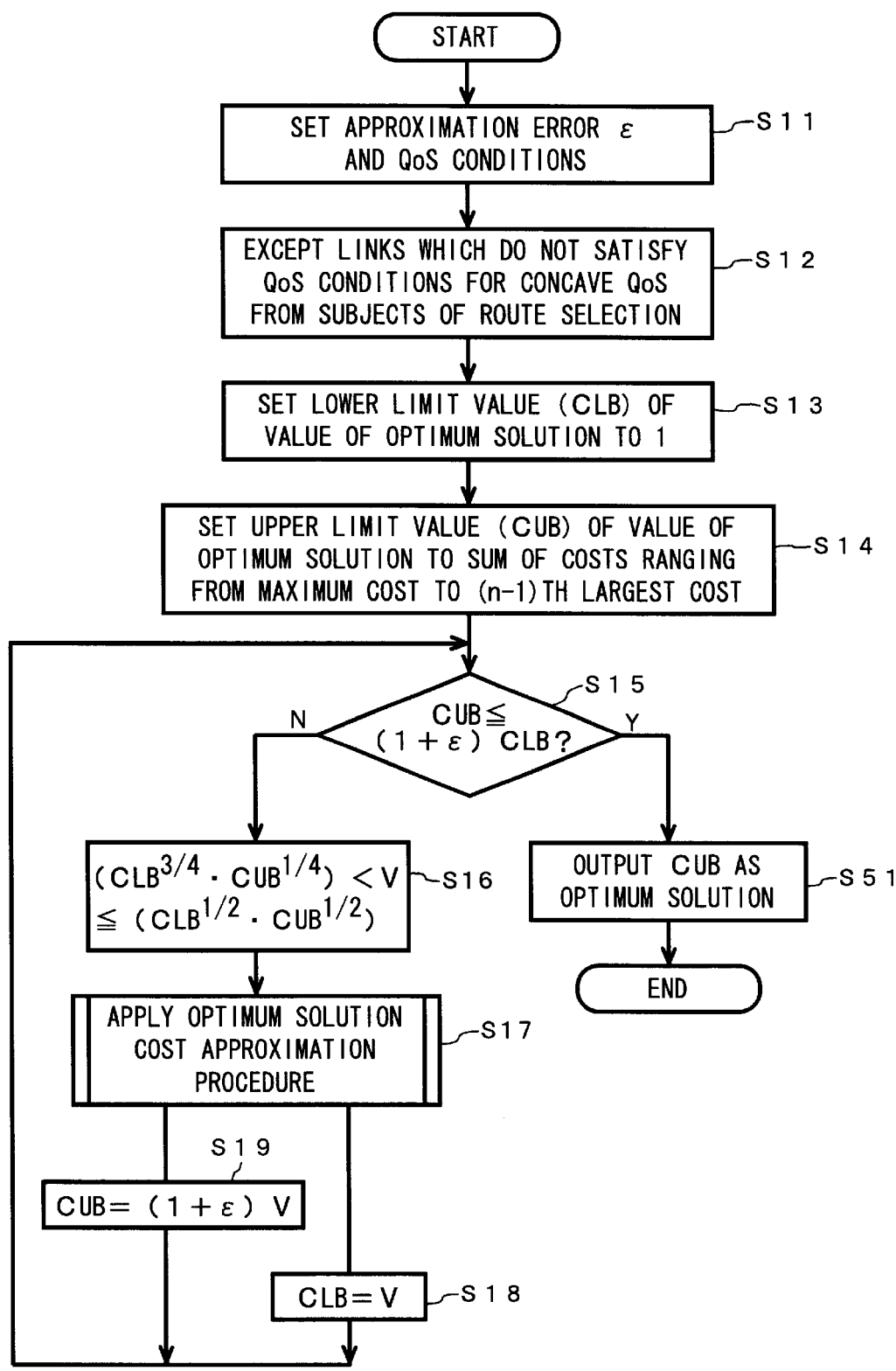
FIG. 4 is a flow chart of a first embodiment of the present invention.

With reference to flow charts of FIGS. 4 and 5, operation of an embodiment of a route selection method according to the present invention will now be described in detail by taking the network described with reference to FIGS. 9 and 10 as an example. FIG. 4 is a flow chart showing the principal operation of the route selection method according to the present invention.

At step S11, a plurality of QoS conditions to be satisfied and an approximation error ε are set. It is now assumed that an unknown optimum route has a minimum cost OPT among routes satisfying all QoS conditions. An approximation error permissible for the minimum cost OPT is ε. The approximation error ε is set beforehand to such a value that a route can be regarded as a substantial optimum route provided that the derived cost of the route becomes equal to or less than OPT (1+ε).

In the present embodiment, "0.5" is set as the approximation error ε. As a plurality of QoS conditions, conditions (reference values) concerning QoSs of the bandwidth, transmission delay, and error rate are set. In the present embodiment, it is assumed that the bandwidth is set to at least 3, the transmission delay is set to at most 16, and the error rate is at most 0.05.

With respect to the concave bandwidth among QoSs, a link between D and J (bandwidth=2) which does not satisfy the QoS condition [≧3] is removed from the subjects of the route selection at step S12. At step S13, "1" is tentatively set as the lower limit value CLB of the cost searching range.

At step S14, the sum of costs ranging from the maximum cost to a [n (the number of nodes)−1]th largest cost is set as the upper limit value CUB. In the present embodiment, the number of nodes is 10 (A to J). As the sum of costs ranging from the maximum cost of 26 (between A and E) to the ninth cost, therefore, 78 is set as the upper limit value CUB. Because 26 (between A and E)+20 (between C and D)+20 (between F and J)+2 (between A and B)+2 (between A and G)+2 (between B and C)+2 (between C and F)+2 (between E and F)=78.

At step S15, it is determined on the basis of the lower limit value CLB and the upper limit value CUB whether the cost searching range has been sufficiently narrowed. If the lower limit value CLB and the upper limit value CUB satisfy the following equation (1), then the cost searching range is judged to be sufficiently narrowed, and the processing proceeds to step S51.

$$CUB \leq (1+\epsilon) \cdot CLB \quad (1)$$

Here, the lower limit value CLB is "1", the upper limit value CUB is "78", and the approximation error ε is 0.5. Therefore, the expression (1) is not satisfied. In order to furthermore narrow the cost searching range, therefore, the processing proceeds to step S16. At the step S16, a variable V satisfying the following expression (2) is derived as a tentative predicted value of the optimum cost.

For a series $a_i$ represented by the following expression, the minimum k satisfying $a_k >$ CUB/CLB is derived in the present embodiment in order to derive the predicted value V satisfying the following expression (2).

$$a_i = 2^{2^i} (i=1, 2, \ldots)$$

Subsequently, V' represented as $V' = a_{k-2}$ is derived, and the predicted value V represented as V=V'·CLB is derived. In the present embodiment, "4" is derived as the predicted value V.

$$(CLB^{3/4}CUB^{1/4}) < V \leq (CLB^{1/2}CUB^{1/2}) \quad (2)$$

At step S17, the optimum solution cost approximation procedure for narrowing the cost searching range is executed under the condition that the predicted value V=4 and the approximation error ε=0.5.

Figure 5:
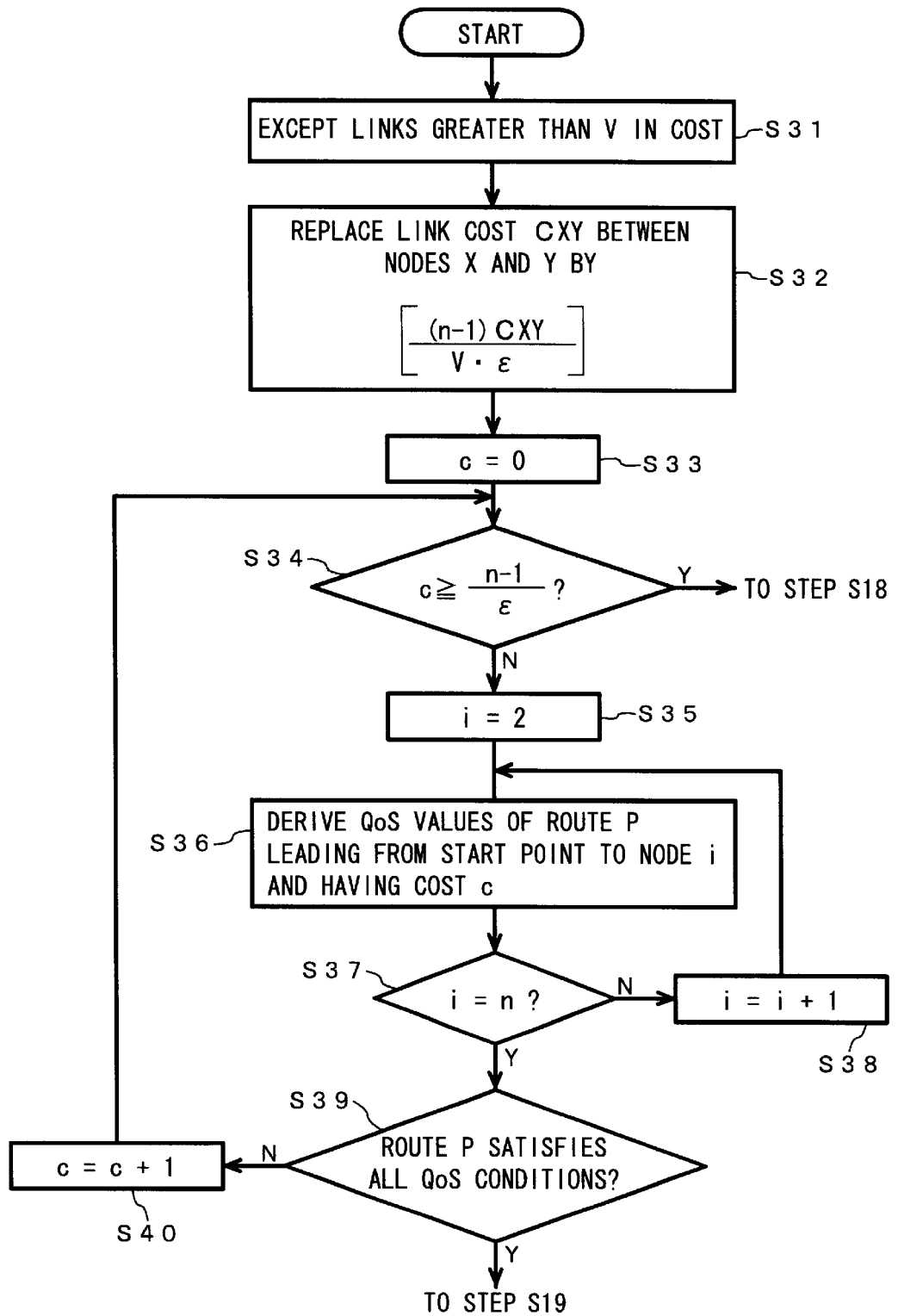
FIG. 5 is a flow chart of an optimum solution cost approximation procedure.

FIG. 5 is a flow chart showing the operation of the optimum solution cost approximation procedure. As links each having a link cost of at least the predicted value V, the link between A and E, the link between C and D, and the link between F and J are excepted from the subjects of the route selection at step S31. At step S32, a link cost Cxy between nodes X and Y is replaced by an approximation value C1xy on the basis of the following expression (3). As a result, link costs having small difference values can be grouped into the same cost. Therefore, the kinds of values respective link costs can assume can be reduced.

$$C1xy = [(n-1) \cdot Cxy/(V \cdot \epsilon)] \quad (3)$$

where [ . . . ] means omitting decimals of . . .

Here, the number of nodes n is "10", the predicted value V is "4", and the approximation error ε is 0.5. For example, therefore, the cost of "2" is replaced by a cost of "9", and the cost "3" is replaced by a cost of "13".

At step S33, an initial value "0" is set as the cost variable c in order to derive QoS values from the start point A to respective nodes every cost in the order of cost, beginning with the minimum cost (=0). At step S34, it is determined whether the following expression (4) is satisfied. If satisfied, the processing proceeds to step S18 of FIG. 4. At the step S18, the lower limit value CLB of the cost searching range is updated to change from "1" to the above described predicted value V (=4). As a result, the cost searching range is narrowed. If the expression (4) is not satisfied, the processing proceeds to step S35.

$$c \geq (n-1)/\epsilon \quad (4)$$

In the present embodiment, the right side of the expression (4) becomes "18". Therefore, the processing proceeds to the step S35. At step S35, an initial value "2" is set as the node variable i in order to derive all QoS values from the start point A (the first node) to an ith node every cost.

With regard to routes starting from the node A, reaching respective nodes, and having the sum of link costs equivalent to c, their QoS values are derived at subsequent steps S36 to S38. In other words, QoS values of the routes starting from the start point A, reaching respective nodes, and having the sum of link costs equivalent to c (=0) are derived. At the step S37, the node variable i is compared with the number of nodes n. If the node variable i does not coincide with the number of nodes n, then the node variable i is increased by "1" at the step S38, and the processing returns to the step S36.

If the node variable i coincides with the number of nodes n at the step S37, then the processing proceeds to step S39. In other words, if QoS values of the routes starting from the node A, reaching the end point node J, and having the sum of link costs equivalent to c are derived, then the processing proceeds to step S39. At the step S39, it is determined whether the derived QoSs satisfy all QoS conditions. Here, a route leading from the start point A to the end point J, having the sum of link costs equivalent to "0", and satisfying all QoS conditions is not present. At step S40, therefore, the cost variable c is increased by "1" and thereafter the processing returns to the step S34.

If in the present embodiment the processing of the steps S34 to S40 is repeated 17 times and the cost variable c becomes "18", then the decision at the step S34 becomes true prior to that at the step S39, and the processing proceeds to the step S18 of FIG. 4.

Referring back to FIG. 4, the predicted value V (=4) is set as the lower limit value CLB at the step S18. Thereafter, the processing returns to the step S15. At the step S15, it is determined whether the space between the upper limit value CUB and the lower limit value CLB has been sufficiently narrowed in the same way as the foregoing description. In the present embodiment, the upper limit value CUB is "78" and the lower limit value CLB is "4". Since the expression (1) is not satisfied, the cost searching range is judged to be still too wide and the processing proceeds to the step S16. At the step S16, the predicted value V is calculated on the basis of the expression (2) in the same way as the foregoing description, and "16" is obtained this time.

At the step S17, the optimum solution cost approximation procedure (FIG. 5) is executed in the same way as the foregoing description, with the predicted value V=16 and the approximation error=0.5 this time. This time, the decision at the step S39 becomes true prior to the decision at the step S34, and the processing proceeds to the step S19 of FIG. 4. Referring back to FIG. 4, the upper limit value CUB is updated to become "24" according to the following expression (5) at the step S19.

$$\text{Upper limit value CUB} = (1+\epsilon)V \quad (5)$$

At the subsequent step S15, it is determined in the same way as the foregoing description whether the space between the upper limit value CUB and the lower limit value CLB has been sufficiently narrowed. In the present embodiment, the upper limit value CUB is "24" and the lower limit value CLB is "4". Since the expression (1) is still false, the processing of the step S16 and subsequent steps is repeated again. When the upper limit value CUB has become "12·2$^{1/2}$" and the lower limit value CLB becomes "8·2$^{1/2}$", the expression (1) becomes true. Therefore, the cost searching range is judged to have been sufficiently narrowed, and the processing proceeds to the step S51. At the step S51, the upper limit value CUB=12·2$^{1/2}$=16.97 is recognized as the sum of link costs of the optimum solution.

As for the numerical value replacement at the step S32 of FIG. 5 and the technique for narrowing the cost searching range on the basis of the magnitude decision at the step S34, they are described in detail in "APPROXIMATION SCHEMES FOR THE RESTRICTED SHORTEST PATH PROBLEM", MATHEMATICS OF OPERATIONS RESEARCH, Vol 17, No. Feb. 1, 1992, which is incorporated herein by reference.

Figure 6:
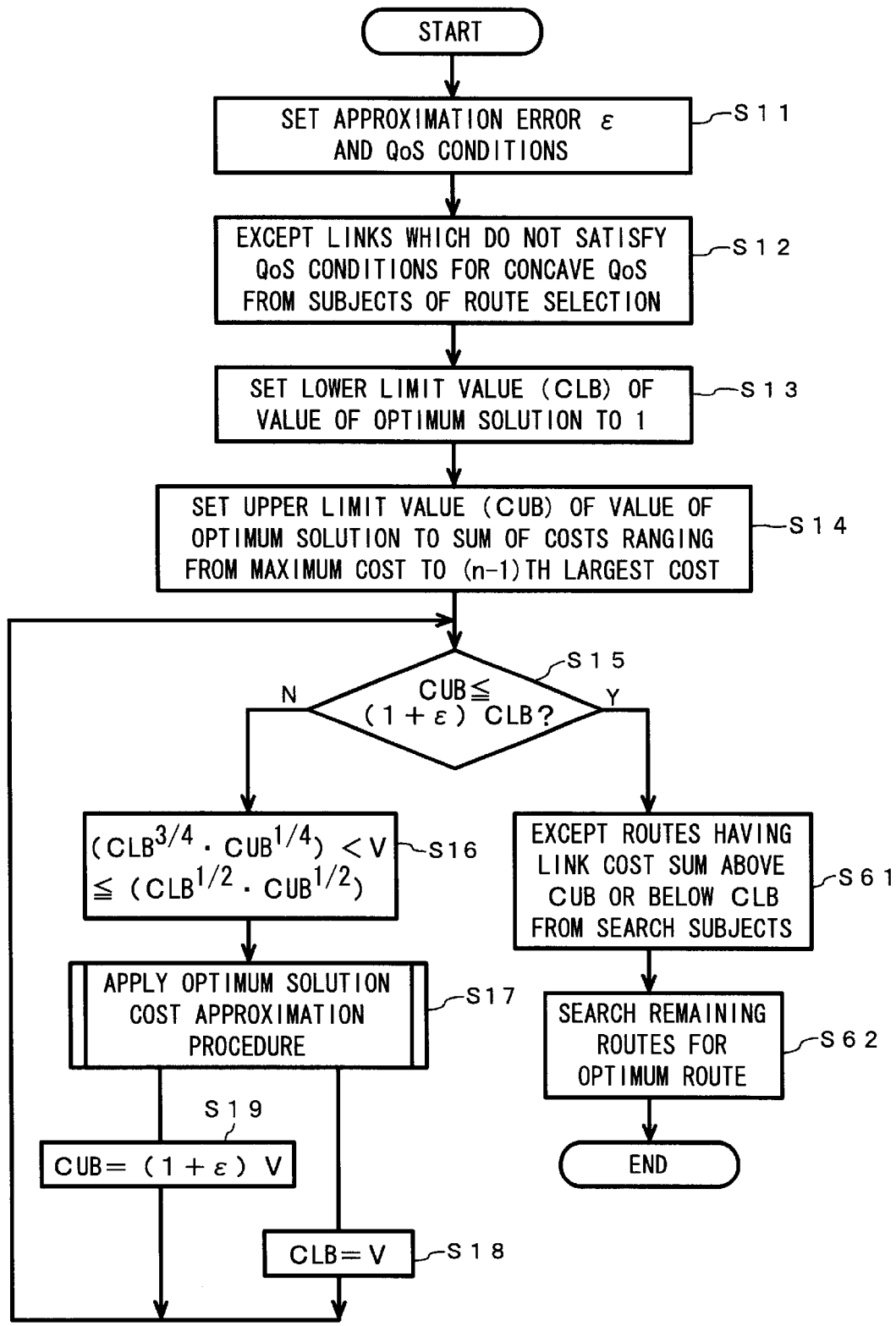
FIG. 6 is a flow chart of a second embodiment of the present invention.

FIG. 6 is a flow chart showing the principal operation of a second embodiment of a route selection method according to the present invention. At the steps denoted by the same characters as those of the foregoing description, like processing is executed, and consequently description of those steps will be omitted.

If in the present embodiment the decision at the step S15 becomes true and the cost searching range becomes sufficiently narrow, then routes having the sum of link costs less than the lower limit value CLB and routes having the sum of link costs greater than the upper limit value CUB are excepted from the search subjects at step S61. At step S62, an optimum route is derived by making all of the remaining routes the subjects.

Figure 7:
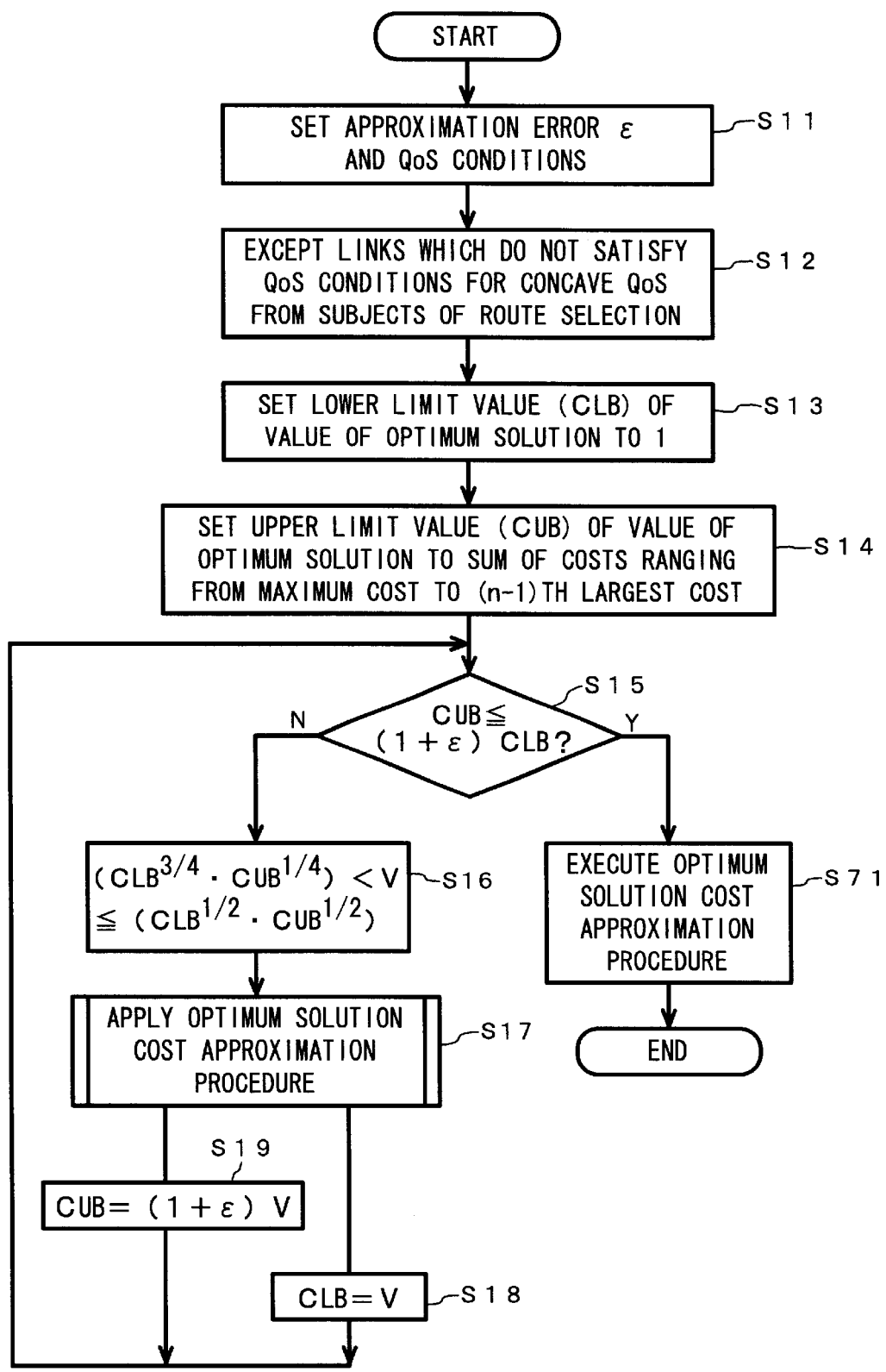
FIG. 7 is a flow chart of a third embodiment of the present invention.
Figure 8:
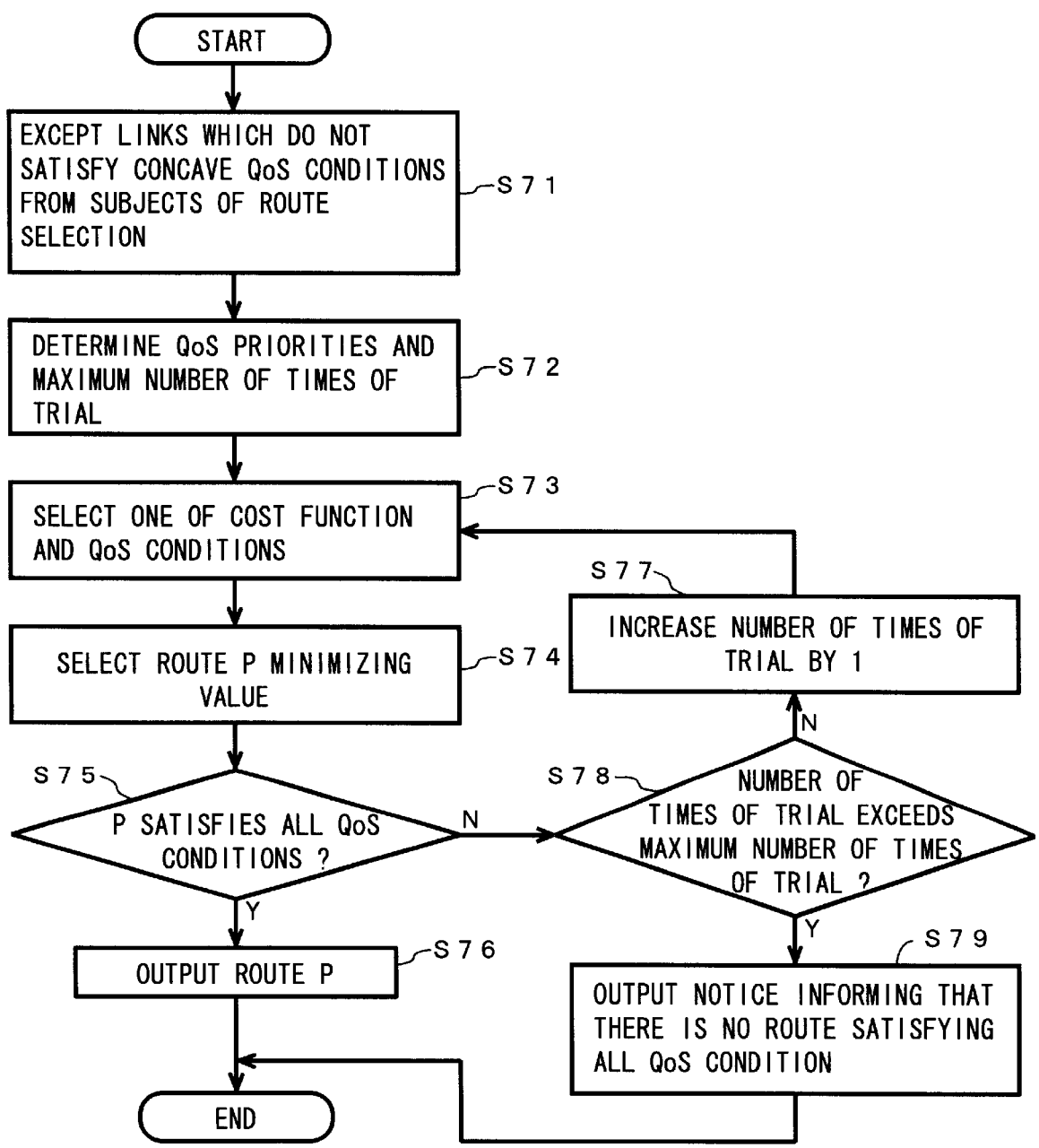
FIG. 8 is a flow chart of a conventional technique.

FIG. 7 is a flow chart showing the principal operation of a third embodiment of a route selection method according to the present invention. At the steps denoted by the same characters as those of the foregoing description, like processing is executed, and consequently description of those steps will be omitted.

If in the present embodiment the decision at the step S15 becomes true and the cost searching range becomes sufficiently narrow, then the optimum solution deriving procedure described before with reference to FIGS. 3 and 11 is executed at step S71 by making the narrowed cost searching range the subject. In other words, starting from the lower limit value CLB, an optimum route is derived by making all routes the subjects.

According to the present invention, the following effects are achieved.

(1) The cost searching range is narrowed beforehand. For only the narrowed range, it is determined for each cost whether a route leading from the start point to the end point is present. As a result, the time required until the optimum solution is derived is shortened.

(2) It becomes possible to derive such an optimum solution as to satisfy an approximation error specified beforehand.

(3) If there are a plurality of routes leading from the start point to each node at the same cost and there is a QoS condition which cannot be satisfied when the end point is reached via one of the routes, then the case where another route is used is examined. If as a result all QoS conditions are satisfied, the route is recognized as the optimum solution. If there is even one route capable of reaching the end point, therefore, it becomes possible to select the route.

What is claimed is:

1. A route selection method for selecting a route satisfying a plurality of QoS conditions at a low cost, out of a plurality of routes connecting a start point to an end point via at least one node, said route selection method comprising the steps of:

setting conditions to be satisfied for a plurality of QoSs, respectively;

inputting an error range permissible for a cost of an unknown optimum route having a minimum cost among routes satisfying all QoS conditions;

tentatively setting a cost searching range containing at least the minimum cost;

determining whether said cost searching range has been narrowed to a searching possible range, said range being a function of said error range;

in response to judgment that said cost searching range has not been narrowed to the searching possible range, deriving a plurality of QoSs of routes leading from the start point to respective nodes at each cost, in order of cost, beginning with a lowest cost within a current cost searching range, on the basis of QoSs of nodes having QoSs already derived;

narrowing said cost searching range when a route leading from the start point to the end point and satisfying all of said plurality of QoS conditions is found, on the basis of it cost; and searching the cost searching range narrowed to said searching possible range for an optimum route.

2. A route selection method according to claim 1, wherein said step of searching the cost searching range narrowed to said searching possible range for an optimum route comprises the step of judging a route contained in said cost searching range to be a substantially optimum route.

3. A route selection method according to claim 1, wherein said step of searching the cost searching range narrowed to said searching possible range for an optimum route comprises the steps of:

deriving a plurality of QoSs of routes leading from the start point to respective nodes at each cost, in order of cost, beginning with a lowest cost within said cost searching range, on the basis of QoSs of nodes having QoSs already derived; and judging a first route satisfying all of said plurality of QoS conditions and leading from the start point to the end point to be a substantially optimum route.

4. A route selection method according to claim 1, wherein said step of searching the cost searching range narrowed to said searching possible range for an optimum route comprises the step of excepting routes each having a cost required for proceeding from the start point to the end point outside said cost searching range from subjects of the search beforehand and searching only remaining routes for an optimum route.

5. A route selection method according to claim 4, wherein in the case where there are a plurality of routes reaching a passing node at the same cost and the relative excellence among the routes reaching the passing node is not determined uniquely with regard to QoSs, said route selection method comprises the steps of:

first determining whether a route reaching the end point via an arbitrary one of the plurality of routes satisfies all QoS conditions;

if even one of a plurality of QoS conditions is not satisfied, then determining this time whether a route reaching the end point via another route satisfies all QoS conditions;

if even one of a plurality of QoS conditions is not satisfied, then determining whether a route reaching the end point via still another route satisfies all QoS conditions;

repeating the determination step route by route; and if any one route satisfies all QoS conditions, then selecting the route as the optimum route.

6. A route selection method according to claim 1, wherein said plurality of QoSs comprises at least one of an additive QoS in which a QoS value of a route is given as sum of QoS values of respective links, a multiplicative QoS in which a QoS value of a route is given as product of QoS values of respective links, and a concave QoS in which a QoS value of a route is given as the minimum value of QoS values of respective links.

7. A route selection method according to claim 2, wherein said plurality of QoSs comprises at least one of an additive QoS in which a QoS value of a route is given as sum of QoS values of respective links, a multiplicative QoS in which a QoS value of a route is given as product of QoS values of respective links, and a concave QoS in which a QoS value of a route is given as the minimum value of QoS values of respective links.

8. A route selection method according to claim 3, wherein said plurality of QoSs comprises at least one of an additive QoS in which a QoS value of a route is given as sum of QoS values of respective links, a multiplicative QoS in which a QoS value of a route is given as product of QoS values of respective links, and a concave QoS in which a QoS value of a route is given as the minimum value of QoS values of respective links.

9. A route selection method according to claim 4, wherein said plurality of QoSs comprises at least one of an additive QoS in which a QoS value of a route is given as sum of QoS values of respective links, a multiplicative QoS in which a QoS value of a route is given as product of QoS values of respective links, and a concave QoS in which a QoS value of a route is given as the minimum value of QoS values of respective links.

10. A route selection method according to claim 5, wherein said plurality of QoSs comprises at least one of an additive QoS in which a QoS value of a route is given as sum of QoS values of respective links, a multiplicative QoS in which a QoS value of a route is given as product of QoS values of respective links, and a concave QoS in which a QoS value of a route is given as the minimum value of QoS values of respective links.

* * * * *